US006397881B1

(12) United States Patent
Asada et al.

(10) Patent No.: US 6,397,881 B1
(45) Date of Patent: Jun. 4, 2002

(54) METHOD FOR IMPROVING FATIGUE STRENGTH DUE TO REPEATED PRESSURE AT BRANCH HOLE PART IN MEMBER FOR HIGH PRESSURE FLUID, BRANCH HOLE PART OF MEMBER FOR HIGH PRESSURE FLUID FORMED BY THE METHOD, AND MEMBER FOR HIGH PRESSURE FLUID WITH BUILT-IN SLIDER HAVING THE BRANCH HOLE

(75) Inventors: Kikuo Asada, Mishima; Masayoshi Usui, Numazu; Eiji Watanabe, Shizuoka Prefecture; Kazunori Takikawa; Ryuichi Kusanagi, both of Numazu, all of (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/033,681

(22) Filed: Mar. 3, 1998

(30) Foreign Application Priority Data

| | | |
|---|---|---|
| Mar. 3, 1997 | (JP) | 9-063843 |
| Mar. 3, 1997 | (JP) | 9-063844 |
| Mar. 3, 1997 | (JP) | 9-063845 |
| Mar. 3, 1997 | (JP) | 9-063846 |

(51) Int. Cl.[7] .......... F16K 43/00; F16L 41/08
(52) U.S. Cl. .......... 137/318; 285/125.1; 285/133.11
(58) Field of Search .......... 137/318; 285/125.1, 285/133.11, 133.4; 123/469

(56) References Cited

U.S. PATENT DOCUMENTS

| | | | |
|---|---|---|---|
| 1,246,456 | A | 11/1917 | Parpert |
| 1,264,854 | A | 4/1918 | Possons |
| 1,476,756 | A | 12/1923 | Junkers |
| 1,519,010 | A | 12/1924 | Reznor |

(List continued on next page.)

FOREIGN PATENT DOCUMENTS

| | | |
|---|---|---|
| FR | 806413 | 12/1936 |
| GB | 836524 | 6/1960 |
| JP | 2-802289 | 9/1990 |
| JP | 3-177693 | 8/1991 |
| JP | 4-175462 | 6/1992 |
| NL | 88663 | 7/1958 |

* cited by examiner

*Primary Examiner*—George L. Walton
(74) *Attorney, Agent, or Firm*—Anthony J. Casella; Gerald E. Hespos

(57) ABSTRACT

A member for a high pressure fluid or a member for a high pressure fluid with a built-in slider having higher quality which can be provided at a low price, and by which the generation of tensile stress in the lower end inner peripheral edge part of a branch hole can be canceled by compressive residual stress to be effectively restrained, the internal pressure fatigue strength in the branch hole part can be improved to be excellent in durability, prevent a fluid leakage due to the occurrence of cracks and then exhibit a sure and stable function, further only the addition of the pressing force applying process to the ordinary manufacturing process will be sufficient, and complicated equipment is not required to hardly cause the problems of an increase in the equipment cost due to an increase in the number of processes and lowering of productivity.

The method of forming a branch hole communicating with a hollow part in a member for a high pressure fluid having the hollow part, which is characterized in that before or after, or simultaneously with a process of pressing inward the member for a high pressure fluid from the outside to form a part where compressive stress remains on the hollow part side inner peripheral surface, a process of boring a branch hole opened to the hollow part is executed to make the compressive residual stress exist in the peripheral edge of the branch hole, and a branch hole part of a member for a high pressure fluid formed by the described method.

3 Claims, 18 Drawing Sheets

U.S. PATENT DOCUMENTS 1,841,879 A 1/1932 Croxford
2,041,209 A 5/1936 Ridley
2,426,106 A 8/1947 Kinley
2,859,870 A 11/1958 Hitz
3,068,029 A 12/1962 Schwartz
3,082,850 A 3/1963 Weening
3,094,137 A 6/1963 Burke
3,259,003 A 7/1966 Griffin
3,277,683 A 10/1966 Knoblock
4,129,028 A 12/1978 Leftheris et al.
4,163,561 A * 8/1979 Butler ......................... 37/318
4,364,406 A 12/1982 Bohlin
4,399,829 A 8/1983 Schuler
4,574,443 A * 3/1986 Persak et al. ............ 29/890.11
4,680,845 A 7/1987 Miller
4,741,081 A 5/1988 Redman
4,832,376 A 5/1989 Sugao
4,893,601 A 1/1990 Sugao
4,900,180 A 2/1990 Takikawa
4,979,295 A 12/1990 Stagni et al.
5,072,710 A 12/1991 Washizu
5,120,084 A 6/1992 Hashimoto
5,136,999 A 8/1992 Bassler et al.
5,143,410 A 9/1992 Takikawa
5,169,182 A 12/1992 Hashimoto
5,172,939 A 12/1992 Hashimoto
5,192,026 A 3/1993 Rix et al.
5,265,456 A 11/1993 Kennedy et al.
5,667,255 A 9/1997 Kato
5,887,910 A 3/1999 Usui
5,957,507 A 9/1999 Asada
5,979,945 A 11/1999 Hitachi et al.
5,992,904 A 11/1999 Hitachi et al.
6,050,611 A 4/2000 Asada FIG.2(a)
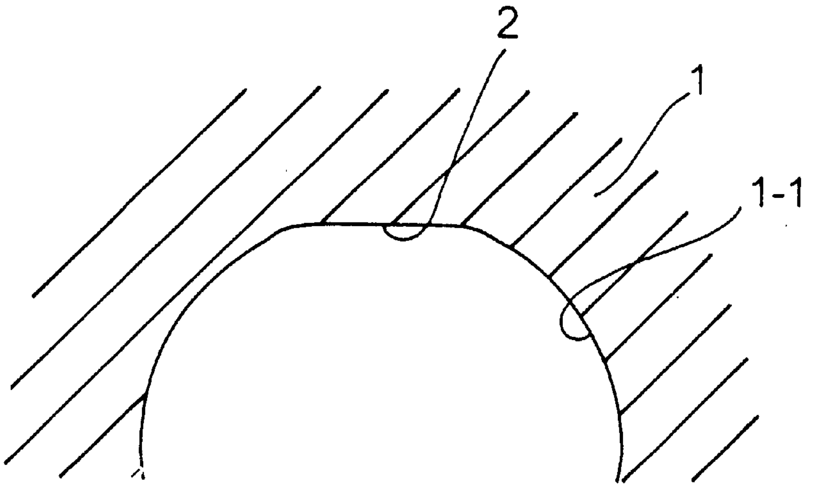
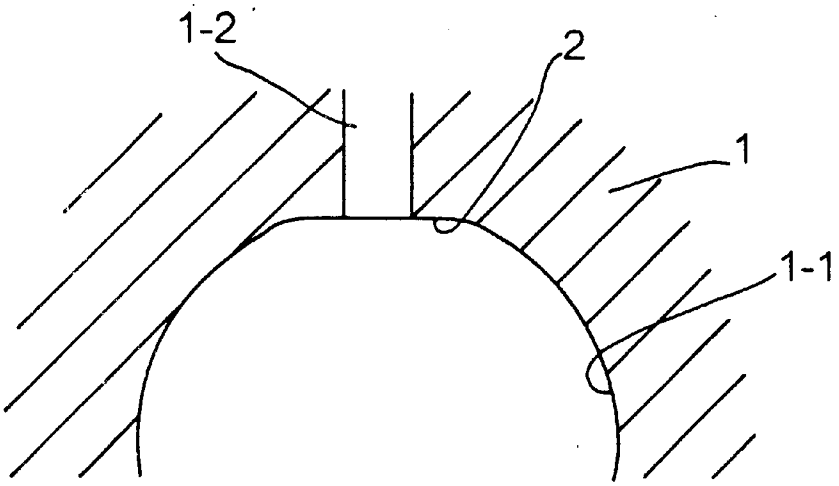
FIG.2(b)

FIG.3(a)
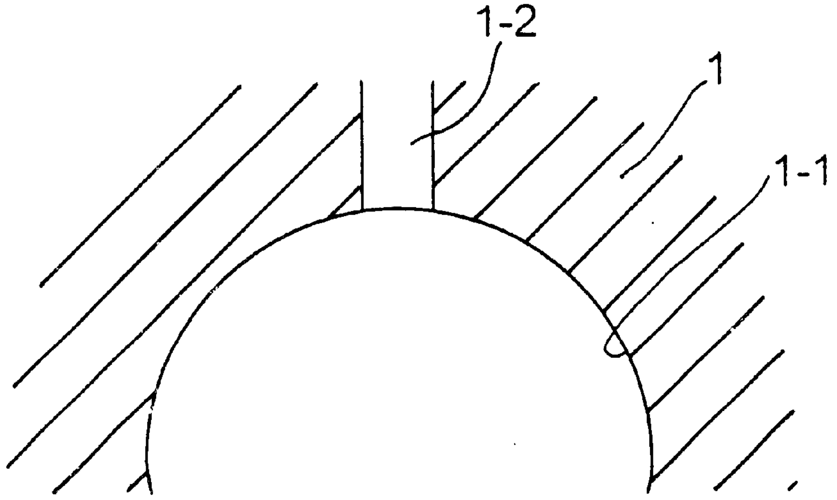
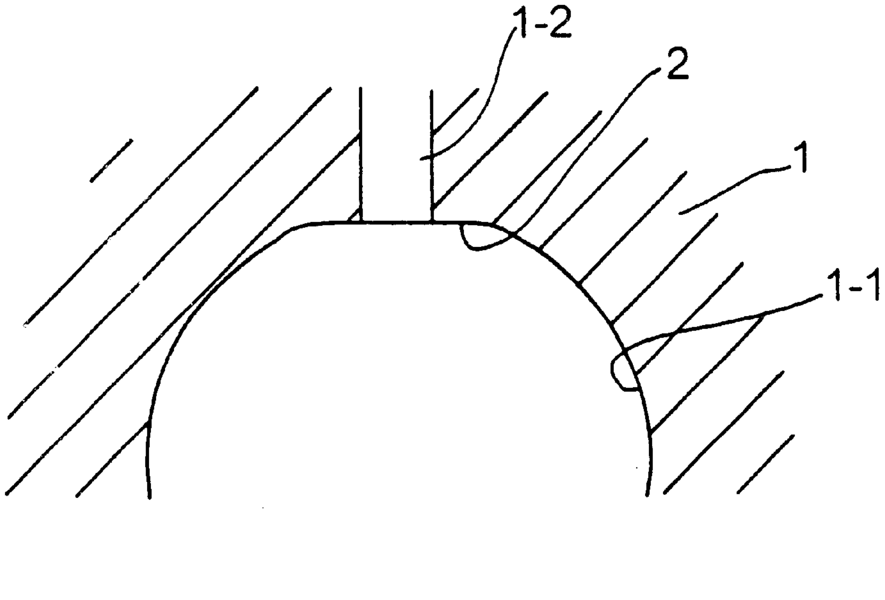
FIG.3(b)

FIG. 11(a)
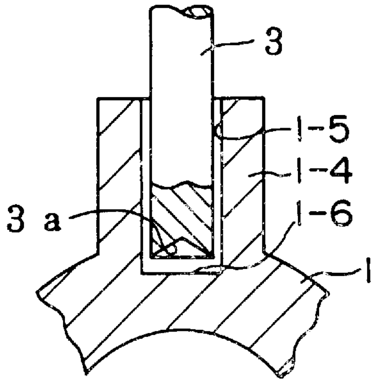
FIG. 11(b)
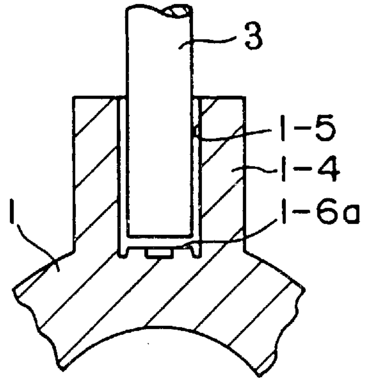
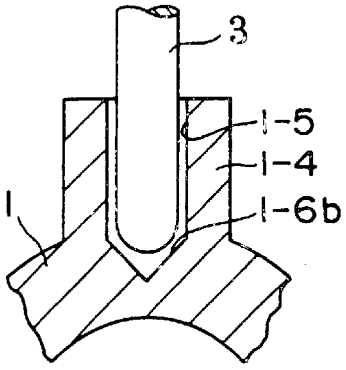
FIG. 11(c)
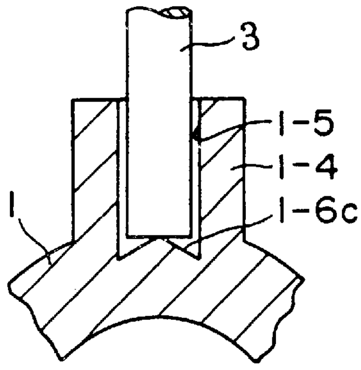
FIG. 11(d)
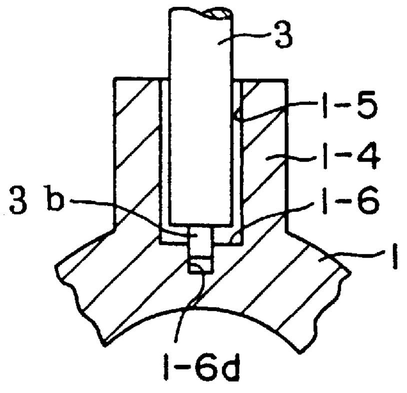
FIG. 11(e)

METHOD FOR IMPROVING FATIGUE STRENGTH DUE TO REPEATED PRESSURE AT BRANCH HOLE PART IN MEMBER FOR HIGH PRESSURE FLUID, BRANCH HOLE PART OF MEMBER FOR HIGH PRESSURE FLUID FORMED BY THE METHOD, AND MEMBER FOR HIGH PRESSURE FLUID WITH BUILT-IN SLIDER HAVING THE BRANCH HOLE

BACKGROUND OF THE INVENTION

1. Field of the Invention

This invention relates to a method for improving fatigue strength due to repeated pressure at a branch hole part of a member for a high pressure fluid such as fuel injection system parts for forming a fuel injection system for a Diesel engine, for example, a fuel injection pump, a fuel injection nozzle, a fuel injection pipe, and a common rail, an injection pump, an injection nozzle, an injection pipe and a feedback pie for a fuel pressure accumulation system, a pressure vessel and the like, and a branch hole part of a member for a high pressure fluid formed by the method, and further to a member for a high pressure fluid with a built-in slider, thereby improving fatigue strength due to the repeated pressure at the branch hole part of a member for a high pressure fluid such as fuel injection system parts for forming a fuel injection system for a Diesel engine, for example, a fuel injection pump and a fuel injection nozzle, and an injection pump, an injection nozzle and so on for a fuel pressure accumulation system.

2. Description of the Prior Art

Conventionally, a branch hole part formed by a branch hole formed in the thickness part of a member for a high pressure fluid for communicating a hollow part of a member for a high pressure fluid of this type, or a flow passage of a member for a high pressure fluid with a built-in slider with a passage of a branch hole member is so constructed that a branch hole is bored in a hollow part or a flow passage (hereinafter referred to as a hollow part) formed by the inner peripheral surface having a circular section to be communicated with a passage of the branch hole member.

However, in such a structure that a branch hole is simply bored in the hollow part having a complete round section of a member for a high pressure fluid having a complete round section to be communicated with a passage of a branch hole member, when high repeated internal pressure is applied to the hollow part of the member for a high pressure fluid, the largest tensile stress is generated at the opening end part of an outlet of the branch hole in the hollow part of the member for a high pressure fluid, so that cracks due to metal fatigue caused by repeated pressure occur easily, with the opening end part as the starting point, resulting in the possibility of causing the leakage of a fluid.

As a measure to improve the fatigue strength due to such repeated pressure, an annular groove is formed on the inner peripheral surface of the hollow part including the outlet position of the branch hole, or a pocket is formed on the outlet of the branch hole on trial, but in the former case, it is necessary to adopt machining for accurately executing formation of an annular groove including the outlet of the branch hole, so the work requires much time to be quite unsuitable for the recent mass production system, and there is the possibility of damaging not only portions required to be machined by the other inner peripheral surfaces. On the other hand, in the latter case, as the formation of the above pocket is executed electrochemically, it agrees with the above mass production system, but actually stress is concentrated on the opening end part of the outlet of the branch hole in the hollow part of the member for a high pressure fluid, so that even if such a process is executed, it does not give much effect of improving fatigue strength.

SUMMARY OF THE INVENTION

This invention has been proposed in order to solve the described problems in the conventional branch hole part of a member for a high pressure fluid, and it is an object of the invention to provide a method for improving the fatigue strength due to repeated pressure at the branch hole part in a member for a high pressure fluid, by which the maximum stress value generated in an opening end part of an outlet of a branch hole on the hollow part side of the member for a high pressure fluid is lowered to further improve the internal pressure fatigue strength, a branch hole part of a member for a high pressure fluid formed by the method, and a member for a high pressure fluid with a built-in slider having the branch hole.

In order to accomplish the foregoing object, in accordance with a first embodiment of the present invention, there is provided a method for improving the fatigue strength due to repeated pressure at a branch hole part in a member for a high pressure fluid, characterized in that at the time of forming a branch hole communicated with a hollow part in a member for a high pressure fluid having the hollow part, the member for a high pressure fluid is pressed inward from the outside to form a part where compressive stress remains on the hollow part side inner peripheral surface and subsequently a branch hole opened to the hollow part is bored in the part to make the compressive residual stress exist at least in the peripheral edge of the branch hole.

In accordance with a second embodiment of the present invention, there is provided a method for improving the fatigue strength due to repeated pressure at a branch hole part in a member for a high pressure fluid, characterized in that at the time of forming a branch hole communicated with a hollow part in a member for a high pressure fluid having the hollow part, a branch hole opened to the inner peripheral surface of the member is bored in the member for a high pressure fluid and subsequently the branch hole part of the member for a high pressure fluid is pressed inward to the outside to make compression stress remain at least on a part of the peripheral edge of the branch hole in the hollow part side inner peripheral surface.

Further in accordance with a third embodiment of the present invention, there is provided a method for improving the fatigue strength due to repeated pressure at a branch hole part in a member for a high pressure fluid, characterized in that the time of forming a branch hole communicated with a hollow part in a member for a high pressure fluid having the hollow part, the member for a high pressure fluid is pressed inward from the outside to form a part where compressive stress remains on the hollow part side inner peripheral surface and simultaneously punch a branch hole opened to the hollow part, thereby making the compressive residual stress exist on the peripheral edge of the branch hole.

In accordance with a fourth embodiment of the present invention, there is provided a method for improving the fatigue strength due to repeated pressure at a branch hole part in a member for a high pressure fluid, characterized in that the time of forming a branch hole communicated with a hollow part in a member for a high pressure fluid having the hollow part, the member for a high pressure fluid is pressed inward from the outside a little eccentrically from a portion where to provide the branch hole to make compressive residual stress exist on the peripheral edge part of the branch hole.

Further in accordance with a fifth embodiment of the present invention, there is provided a method for improving the fatigue strength due to repeated pressure at a branch hole part in a member for a high pressure fluid, characterized in that the time of forming a branch hole communicated with a hollow part in a member for a high pressure fluid having the hollow part, the member for a high pressure fluid is pressed inward from the outside at least at two portions in the diametral direction a little eccentrically from a portion where to provide the branch hole.

Further in accordance with a sixth embodiment of the present invention, there is provided a method for improving the fatigue strength due to repeated pressure at a branch hole part in a member for a high pressure fluid, characterized in that at the time of forming a branch hole communicated with a hollow part in a member for a high pressure fluid having the hollow part, the member for a high pressure fluid is pressed inward from the outside to form a portion where compressive stress remains in a range wider than the area where to provide the branch hole in the hollow part side inner peripheral surface and bore a branch hole in the central part of the portion.

Further in accordance with a seventh embodiment of the present invention, there is provided a branch hole part of a member for a high pressure fluid, characterized in that a branch hole communicated with a hollow part is bored in the member for a high pressure fluid having the hollow part and the inner peripheral edge part of the branch hole has the compressive residual stress.

Further in accordance with an eighth embodiment of the present invention, there is provided a member for a high pressure fluid with a built-in slider having a branch hole, in a member for a high pressure fluid, which includes a hollow part in the axial interior and a branch hole communicated with the hollow part on at least one boss part provided on the axial peripheral wall part, and has a slider in the hollow part, wherein the pressing force is applied in the axial direction of the boss part by an external pressure system in such a manner that at least a part of the opening end part of the flow passage of the branch hole is projected, and then the projected part is removed to form a complete round inner peripheral surface.

Further in accordance with a ninth embodiment of the present invention, there is provided a member for a high pressure fluid with a built-in slide having a branch hole, in a member for a high pressure fluid which includes a hollow part in the axial interior and a branch hole communicated with the hollow part at least on one sleeve nipple part fitted the axial peripheral part by welding or brazing, and has a slider in the hollow part, wherein the pressing force is applied in the axial direction of the sleeve nipple by an external pressure system in such a manner that at least a part of the opening end part of a flow passage of the branch hole is projected, and then the projected part is removed to form a complete round inner peripheral surface.

That is, the present invention adopts the methods shown in the described first to sixth embodiments as a method for generating compressive residual stress in the periphery of the opening end part of an outlet of a branch hole in a hollow part of a member for a high pressure fluid, in which the compressive residual stress is made exist in the periphery of an opening end part of an outlet of a branch hole communicated with a passage of a branch hole member in a hollow part of a member for a high pressure fluid, whereby a high internal pressure of the hollow part of the member for a high pressure fluid, and if circumstances require, also the stress generated in the inner peripheral edge part of the lower end of the branch hole by the radial force applied to the wall thickness part of the member for a high pressure fluid at the time of putting the branch hole member in the connecting state are canceled by the compressive residual stress to lower the maximum tensile stress value generated in the inner peripheral edge part of the lower end of the branch hole.

Further, not to be a hindrance to sliding of a slider built in the hollow part, when the pressing force is applied to the member for a high pressure fluid from the outside so that the hollow part side inner peripheral surface is deformed and projected, the projected part is removed by cutting or grinding to form a complete round inner peripheral surface.

In this case, as a method for applying the pressing force to the member for a high pressure fluid from the outside, for example, used is a method in which with a member for a high pressure fluid fixed to a lower die, pressure is applied inward in the radial direction from the outside of the member for a high pressure fluid by a punch or a rod.

As described above, according to the present invention, the compressive residual stress is made exist in the periphery of an opening end part of a branch hole in the hollow part side branch hole part of the member for a high pressure fluid, whereby the generation of tensile stress in the inner peripheral edge of the lower end of the branch hole can be canceled by the compressive residual stress to be effectively restrained, so that it is possible to improved the internal pressure fatigue strength in the branch hole part of the member for a high pressure fluid.

BRIEF DESCRIPTION OF THE DRAWINGS

FIG. 2 is a cross section for explaining one embodiment of a method for improving the fatigue strength according to the present invention, (a) is a diagram before boring a branch hole after the pressing force is applied, and (b) is a diagram after boring a branch hole.

FIG. 3 is a cross section for explaining another embodiment of a method for improving the fatigue strength according to the present invention, (a) is a diagram after boring a branch hole, and (b) is a diagram showing the condition where after a branch hole is bored, the pressing force is applied.

FIG. 11 illustrates the pressing force applying means by the external pressure system in the embodiment of FIG. 10, (A) is a cross section of a boss part, with portions broken away, showing a method of pressing by a punch, the pressing surface of which is formed in an inverted recessed shape, (B) is a cross section of a boss part showing a method of providing an annular projection on the inner bottom plate of the boss part and pressing by a punch, the pressing surface of which is flat, (C) is a cross section of a boss part showing a method of forming the inner bottom part of the boss part in a recessed shape and pressing by a punch, the pressing surface of which is a curved surface such as a spherical surface, (D) is a cross-section of a boss part showing a method of providing a conical projection on the inner bottom plate of the boss part and pressing by a punch, the pressing surface of which is flat, (E) is a cross-section of a boss part showing a method of providing a bottomed hole and pressing by a punch with a projection to be fitted in the bottomed hole and a length larger than the depth of the bottomed hole.

DETAILED DESCRIPTION OF PREFERRED EMBODIMENTS

Figure 1:
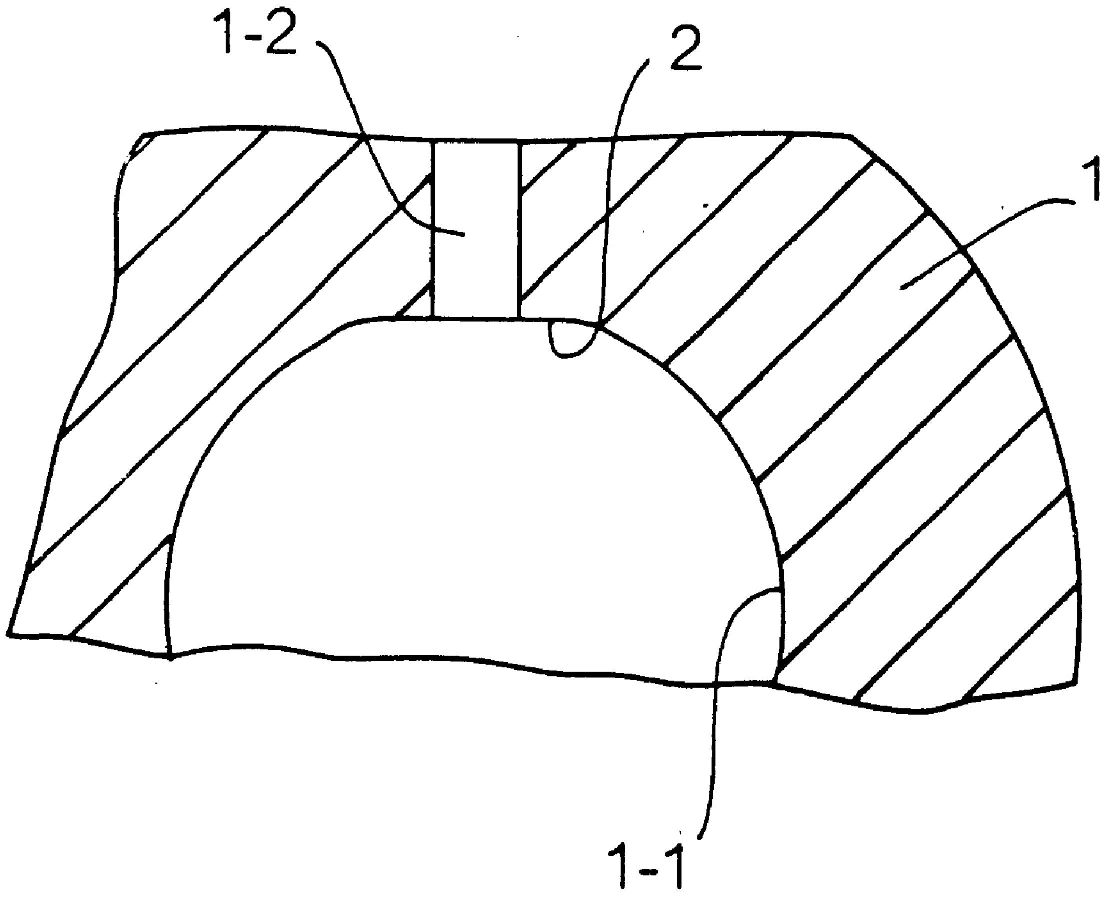
FIG. 1 is a partial enlarged cross section of one embodiment of a member for a high pressure fluid having a branch hole according to the present invention.

The present invention will now be described with reference to the attached drawings.

First in FIGS. 1 to 9, the reference numeral 1 is a member for a high pressure fluid of fuel injection system parts for forming a fuel injection system for a Diesel engine, for example, a fuel injection pump, a fuel injection nozzle, and a fuel injection pipe, a common rail, an injection pump, an injection nozzle, an injection pipe, a feedback pipe for a fuel pressure accumulation system, and a pressure vessel.

A hollow part 1—1 formed by a substantially circular inner peripheral surface is provided in the interior of the above member 1 for a high pressure fluid, a branch hole 1–2 for communicating a passage of a branch hole member (not shown) with the hollow part 1—1 is bored in such a manner as to penetrate the wall thickness part of the member for a high pressure fluid, a branch hole part 2 where compressive residual stress is generated is formed on the hollow part 1—1 side in the periphery of the opening end part substantially around the outlet of the branch hole 1–2, and especially when the branch hole part 2 where compressive residual stress is generated is formed by projecting in such a manner as to be substantially circular on the hollow part 1—1 side and be at least substantially flat, its effect is remarkable.

A method for improving fatigue strength due to repeated pressure at the branch hole part 2 in the member 1 for a high pressure fluid according to the present invention will now be described with reference to FIG. 2.

According to a process shown in FIG. 2, the member 1 for a high pressure fluid of the present invention has the hollow part 1—1 formed in the interior thereof by machining such as boring or the like and has a comparatively thick wall thickness part. The wall thickness part is pressed inward in the radial direction from the outside by a press method using a punch or rod to form the branch hole part 2 where compressive residual stress is generated on the hollow part 1—1 side, and especially it is desirable to form the branch hole part 2 where compressive residual stress by projecting the hollow part 1—1 side to be substantially circular and be at least flat (See FIG. 2 (*a*)).

At this time, the pressing force is not particularly limited, but preferably it is the degree to which at least the inner peripheral surface of the hollow part 1—1 of the member 1 for a high pressure fluid is a little flattened. By the pressing force by a press method using a punch or the like, the compressive residual stress is generated in the periphery of the branch hole part 2, and especially the inner peripheral surface of the hollow part 1—1 is a little flattened, and when the pressing force is applied, a plastic deformed part and an elastic deformed part are produced, and deformation is produced by a difference in return amount at the time or removing the pressing force, high compressive residual stress is generated in the periphery of the branch hole part 2.

Subsequently, a branch hole 1–2 is bored in the substantially central part of the formed branch hole part 2 in such a manner as to have an outlet by cutting using a drill or the like (See FIG. 2 (*b*)).

In the described embodiment, first the wall thickness part of the member for a high pressure fluid is pressed inward in the radial direction from the outside by a press method using a punch or the like to generate compressive residual stress on the hollow part 1—1 side of the member 1 for a high pressure fluid corresponding to the later formed branch hole 1–2 part, and especially if the branch hole part 2 is formed by projecting the hollow part 1—1 side to be substantially circular and be at least substantially flat, compressive residual stress can be remarkably generated. Subsequently, the branch hole part 1–2 is bored in such a manner as to have an outlet in the substantially central part of the branch hole part 2 to penetrate the wall thickness part of the member 1 for a high pressure fluid, so that a high internal pressure of the hollow part 1—1 of the member for a high pressure fluid, and if circumstances require, also the stress generated at the inner peripheral edge part of the lower end of the branch hole 1–2 by the radial force applied to the wall thickness part of the member 1 for a high pressure fluid at the time of putting the branch hole member in connecting state are canceled by the compressive residual stress to remarkably lower the maximum tensile stress value generated at the inner peripheral edge part of the lower end of the branch hole 1–2.

A method for improving fatigue strength due to repeated pressure of the present invention can be implemented not only by the process shown in FIG. 2 but also by the process shown in FIG. 3.

According to FIG. 3, as described before, first a branch hole 1–2 is bored by a drill or the like in such a manner as to penetrate the wall thickness part of the member 1 for a high pressure fluid having a hollow part 1—1 (See FIG. 3 (*a*)).

Figure 4:
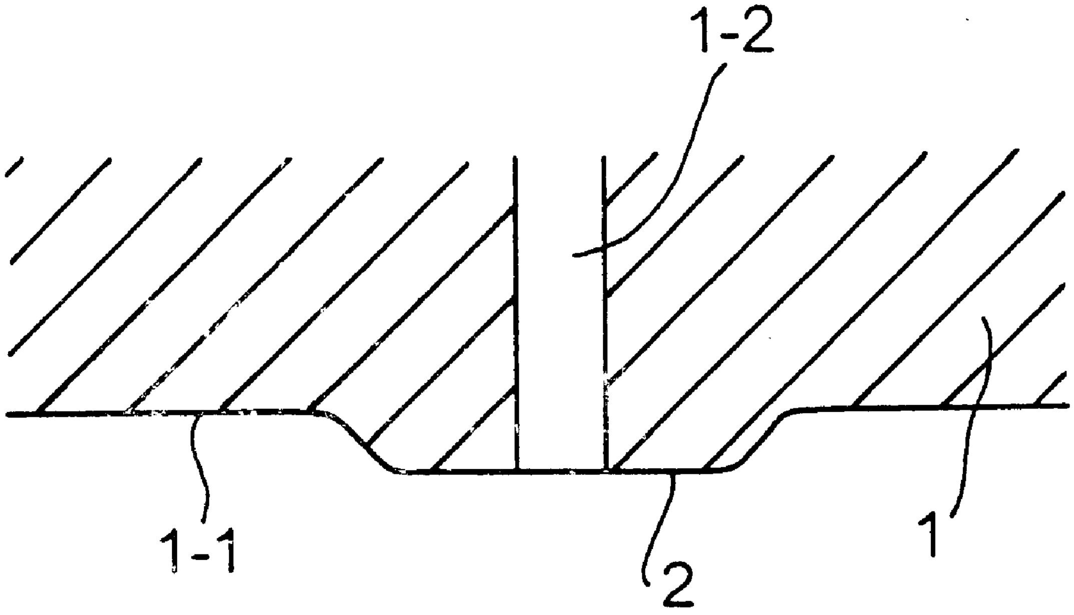
FIG. 4 is a longitudinal section of FIG. 1.

Subsequently, the wall thickness part is pressed inward in the radial direction from the outside by a press method similarly to the above to form a branch hole part 2 where compressive residual stress is generated on the hollow part 1—1 side in such a manner that the outlet of the branch hole 1–2 is substantially in the center, and especially if the hollow part 1—1 side is projected to be substantially circular and be at least flat, it is possible to form a branch hole part 2 where compressive residual stress is remarkably generated ( See FIG. 3(*b*) and FIG. 4).

Also by the method shown in FIG. 3, similarly to the above, the internal pressure of the hollow part 1—1 of the member for a high pressure fluid, and if circumstances require, also the stress generated in the inner peripheral edge part of the lower end of the branch hole 1–2 by the radial force applied to the wall thickness part of the member 1 for a high pressure fluid at the time of putting the branch member in the connecting state can be canceled by the compressive residual stress to remarkably lower the maximum tensile stress value generated in the inner peripheral edge part of the lower end of the branch hole 1–2.

While the described embodiment shown in FIG. 2 adopts a method comprising the steps of first pressing the wall thickness part of the member for a high pressure member inward in the radial direction from the outside by a press method using a punch or the like to form a branch hole part 2, and then boring a branch hole 1–2, and the embodiment shown in FIG. 3 adopts a method comprising the steps of the first boring a branch hole by a drill or the like and then pressing the part by a press method, the branch hole can be pressed and punched at the same time by a punch or the like. This method can be implemented by using a punch or a rod having a punch part or a rod part of the same diameter as that of the branch hole 1–2 and a large-diameter punch part or rod part for forming a portion where to generate compressive residual stress, especially a deformed portion.

As means for pressing the wall thickness part of the member for a high pressure fluid inward in the radial direction from the outside by a press system using a punch or the like to form a branch hole part 2 where compressive residual stress is generated, it is possible to use the methods shown in FIGS. 5–8 in addition to the described embodiments.

Figure 5:
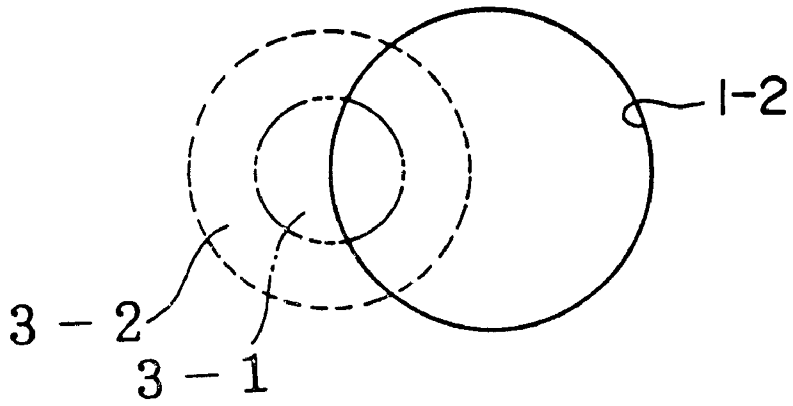
FIG. 5 is a diagram for explaining another embodiment of a method for improving the fatigue strength according to the present invention, which is a schematic plan view showing a method for applying the pressing force a little eccentrically from a portion where to provide a branch hole.

That is, FIG. 5 shows a method of pressing the member 1 for a high pressure fluid by a press method with a punch or a rod a little eccentrically from a portion where to provide a branch hole 1–2 at the time of forming the branch hole 1–2 communicated with a hollow part in the member 1 for a high pressure fluid having the hollow part 1—1 to generate compressive residual stress in a part (especially a part easy to become a starting point of the occurrence of cracks) of the peripheral edge part of a branch hole 3–1, and in FIG. 5, the reference numeral 3–1 shows a range of pressing by a punch or a rod, and 3–2 shows the range of generation of compressive residual stress.

Figure 6:
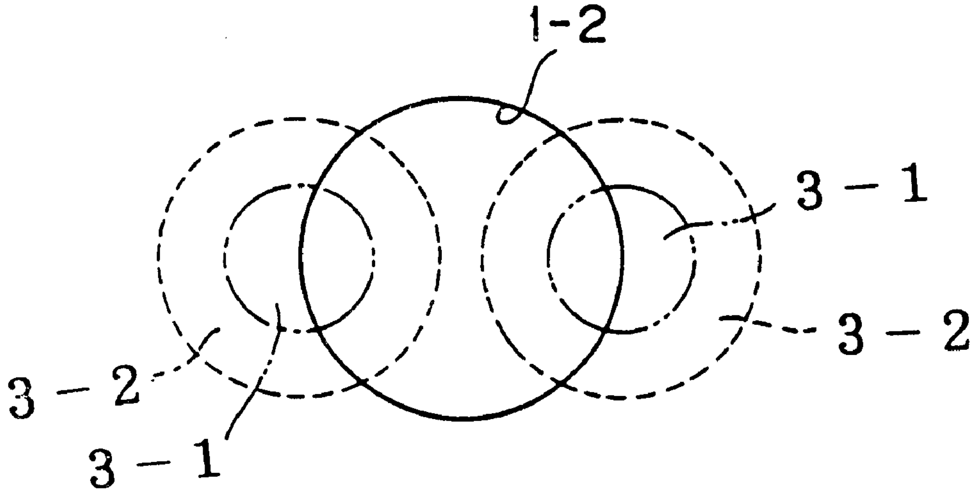
FIG. 6 is a diagram for explaining another embodiment of a method for improving the fatigue strength according to the present invention, which is a schematic plan view showing a method for improving the fatigue strength according to the present invention, which is a schematic plan view showing a method for applying the pressing forced to two diametral portions a little eccentrically from a portion where to provide a branch hole.
Figure 7:
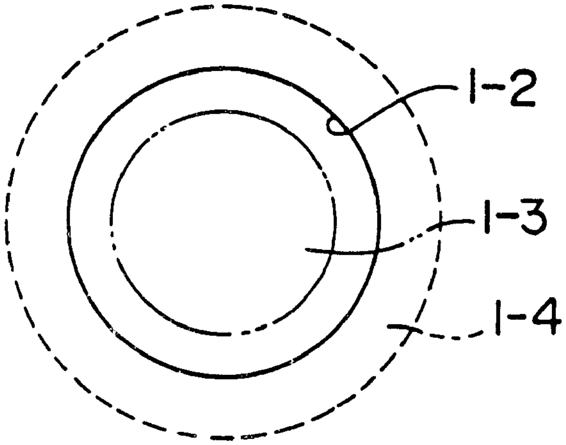
FIG. 7 is a diagram for explaining another embodiment of a method for improving the fatigue strength according to the present invention, which is a schematic plan view showing a method for applying the pressing force in such a manner that the compressive force is generated in a range wider than an area where to provide a branch hole.

FIG. 6 shows a method of pressing the member 1 for a high pressure fluid inward from the outside at least at two portions in the diametral direction a little eccentrically from a portion where to provide a branch hole 1–2 at the time of forming the branch hole communicated with a hollow part in the member 1 for a high pressure fluid 1 having the hollow part from the outside by a method of pressing the member 1 for a high pressure fluid from the outside with a punch or a rod to generate compressive residual stress at least in two portions in the diametral direction of the peripheral edge part of the branch hole. In this case, two portions in the diametral direction means a portion easy to become a starting point of occurrence of cracks similarly to the above. FIG. 7 shows a method of forming a portion where compressive stress remains in a range wider than an area where to provide a branch hole, especially a deformed part by a punch or a rod with a diameter smaller than that of the branch hole 1–2 to bore a branch hole in the central part of the portion at the time of forming the branch hole 1–2 communicated with a hollow part in the member for a high pressure fluid having the hollow part 1—1 by a method of pressing the member 1 for a high pressure fluid from the outside with a punch or a rod.

Figure 8:
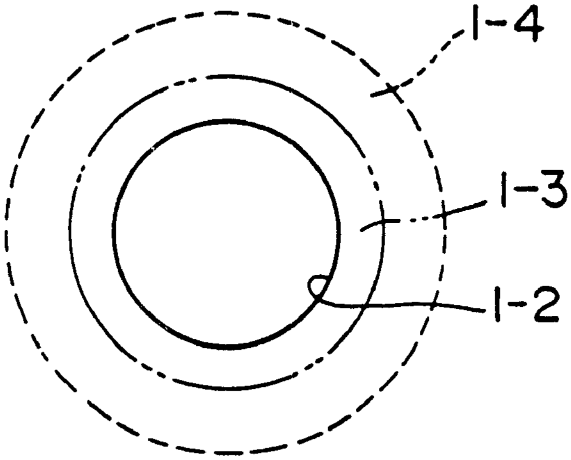
FIG. 8 is a diagram for explaining another embodiment of a method for improving the fatigue strength according to the present invention, which is a schematic plan view showing another embodiment of a method for applying the pressing force in such a manner that the compressive stress is generated in a range wider than an area where to provide a branch hole.

FIG. 8 shows a method of forming a portion where compressive stress remains in a range wider than an area where to provide a branch hole, especially a deformed part by a punch or a rod with a diameter larger than that of the branch hole 1–2 to bore a branch hole 1–2 in the central part of the portion at the time of forming the branch hole 1–2 communicated with a hollow part in the member for a high pressure fluid having the hollow part 1—1 by a method of pressing the member 1 for a high pressure fluid from the outside with a punch or a rod.

Figure 9:
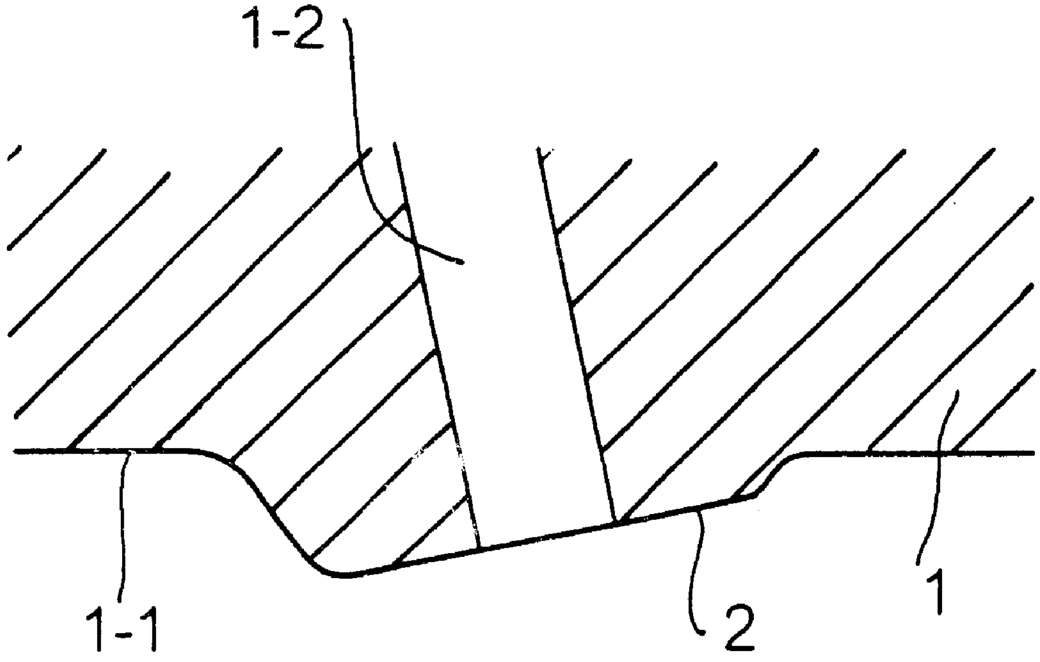
FIG. 9 is a longitudinal section of another embodiment of a member for a high pressure fluid according to the present invention.

Though the described embodiments deals with an example where a branch hole 1–2 is bored in the direction substantially intersecting perpendicularly to the central axis of a hollow part 1—1, this invention is not limited to the above, and as shown in FIG. 9, it is possible to provide a branch hole 1–2 at a certain angle to the central axis of the hollow part 1—1. In this case, it is enough to press the wall thickness part of the member 1 for a high pressure fluid at a desired angle by a punch or the like, and especially if a deformed part is formed, the existence of compressive residual stress becomes remarkable, so that the surface of the branch hole part 2 also has an angle to the central axis.

At the time of forming a portion where compressive stress remains on the inner peripheral surface of a hollow part of the member 1 for a high pressure fluid having the hollow part 1—1 by a method of pressing the member 1 for a high pressure fluid from the outside with a punch or a rod, if the portion where compressive stress remains is not deformed, a slider can be built intact in the hollow part of the member for a high pressure fluid. On the contrary, in the case of forming a deformed projection part on the inner peripheral surface side of the hollow part, an example of applying the slider to the member for a high pressure fluid with a built-in slider will now be described with reference to FIGS. 10–20.

In FIGS. 10 to 20, the reference numerals 1, 11, 21, 31, 41 designate a member for a high pressure fluid with a built-in slider (hereinafter referred to as “a member for a high pressure fluid” for short) of fuel injection system parts for forming a fuel injection system for a Diesel engine, for example, a fuel injection pump, a fuel injection nozzle and so on, 3 a punch and 4 a lower die.

The described member 1 for a high pressure fluid with a built-in slide is so constructed that the interior of the shaft center has a hollow part formed by a circular inner peripheral surface as a flow passage 1–1' and one or plural integrated boss parts 1–4 are provided at spaces on the axial peripheral wall part. In the case of the member 1 for a high pressure fluid having the integrated boss parts 1–4, first in the pre-finishing process (cutting process), a bottomed hole 1–5 with a designated diameter and a designated depth is formed in the boss part 1–4 of the member 1 for a high pressure fluid by cutting with an end mill. According to a method shown in FIG. 10, subsequently to the pre-finishing process, in a press process, the vicinity of the boss part 1–4 of the member 1 for a high pressure fluid is fixed by the lower die 4. The lower die is, as shown in the drawing, formed by a metal mold recessed in section having a curved surface 4–1 with the substantially same radius of curvature as that of the outer peripheral surface of the member 1 for a high pressure fluid, and the member 1 for a high pressure fluid is fixed to the lower die 4 in such a manner as to bind the substantially lower half circle. This is intended for obtaining the effect of press sufficiently. When the member 1 for a high pressure fluid is fixed to the lower die 4, pressing force is applied to the inner bottom part 1–6 of the boss part by the punch 3 which has a diameter smaller than the inside diameter of the bottomed hole 1–5 of the boss part 1–4 and fitted to the press device. The pressing force at this time is not particularly limited, but it may be the degree to which the inner peripheral surface of the flow passage 1—1 of the member for a high pressure fluid positioned right under the inner bottom part of the boss part is a little projected to form a flat part 1–9. By the pressing force of the punch 3, the inner peripheral surface of the flow passage 1—1 of the member for a high pressure fluid is a little flattened, and when the pressing force is applied, a plastic deformed part and an elastic deformed part are produced, whereby compressive residual stress is generated by deformation caused by a difference in return amount when the pressing force is removed.

Subsequently, in a finishing process, a part 2 projected inward to be flattened by the application of pressing force by the punch 3 is removed by machining or the like to form a complete round inner peripheral surface, than a branch hole 1–2 which is communicated with the flow passage 1—1 of the member 1 for a high pressure fluid and uses its peripheral surface which is communicated with the flow passage, circular and opened to the outside as a received pressure bearing surface 1–3, and a female screw 1–7 is machined on the inner peripheral surface of the bottomed hole 1–5 of the boss part. It is permitted to previously form the female screw 1–7 in the pre-finishing process.

FIG. 11 illustrates pressing force applying means by a press method for making the compressive residual stress exist in the periphery of the opening end part of a flow passage of a member for a high pressure fluid of the branch hole 1–2, and (A) is a method in which a recessed part 3*a* having a triangular section is formed on the forward end part of the punch 3 and the pressing force is applied to the bottom part 1–6 of the bottomed hole 1–5 of the boss part 1–4 by the punch 3. In the case of this method, large pressing force can be applied not only to the central part of the bottom but to the inner peripheral wall side, so that compressive residual stress can be effectively made remain extending over a comparatively wide range of the periphery of the branch hole 1–2 provided on the part. (B) is a method in which an annular projection 1–6*a* is provided on the inner bottom part 1–6 of the boss part 1–4, and the upper surface of the annular projection 1–6*a* is pressed by the punch 3, the pressing surface of which is flat to make the compressive residual stress remain extending over a comparatively wide range of the periphery of the later provided branch hole 1–2 similarly to the above (A). (C) is a method in which the inner bottom part of the boss part 1–4 is formed as a recessed part 1–6*a* having an inverted triangular section, and the bottom part formed by the recessed part 1–6*b* is pressed by the punch 3, the pressing surface of which is a spherical surface. In this method, as the slant face of the bottom part is pressed earliest of all by the punch 3, the effect of making compressive residual stress exist in the periphery of the later provided branch hole 1–2 is large. (D) is a method in which a projection 1–6*c* having an angle section is provided on the inner bottom part of the boss part 1–4, and the bottom part formed by the projection 1–6*c* is pressed by the punch 3, the pressing surface of which is flat. In this method, as the apex of the angle-section projection 1–6*c* is pressed earliest of all by the punch 3, large pressing force is applied to the central part of the bottom part. Accordingly, also in this case, large compressive residual stress remains in the periphery of the later provided branch hole 1–2. (E) is a method in which a bottomed hole 1–6*d* with the same diameter as that of the later provided branch hole 1–2 and a suitable depth is provided in the center of the inner bottom part of the boss part 1–4, and the bottom part is pressed by the punch 3, the pressing surface of which is provided with a projection 3*b* having such a diameter as to be fitted in the bottomed hole 1–6*d* and a length larger than the depth of the bottomed hole. In the case of this method, as the bottomed hole 1–6*d* is pressed by the projection 3*b*, the pressing force is concentratively applied to the later provided branch hole 1–2, so that inevitably compressive residual stress remains also in the periphery of the branch hole 1–2. In this arrangement, the shape of the punch tip and the shape of the inner bottom part of the boss part are not limited to the combination of these shapes.

Figure 10:
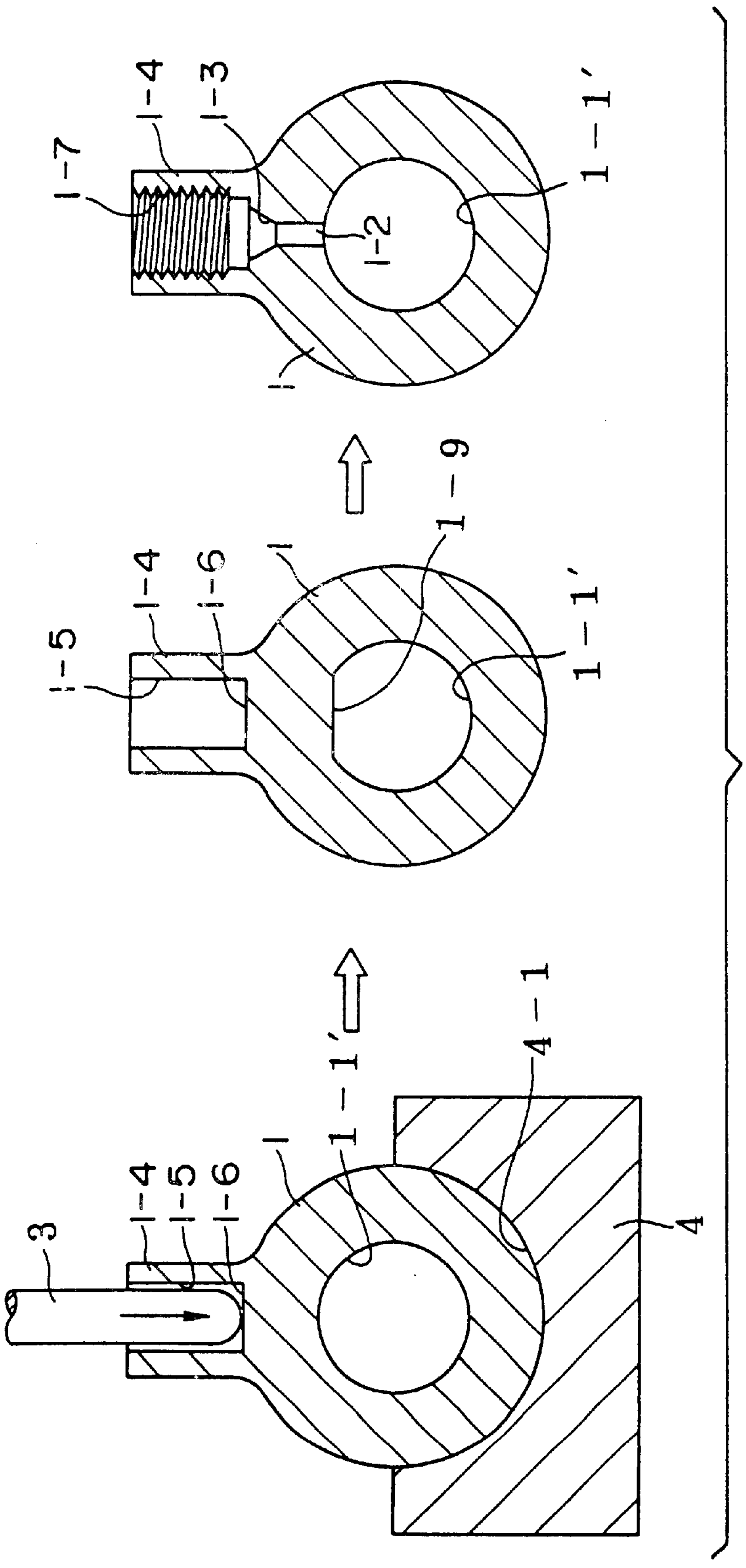
FIG. 10 is a cross section showing one embodiment in which a member for a high pressure fluid having a branch hole is applied to a built-in slider type according to the present invention.
Figure 12:
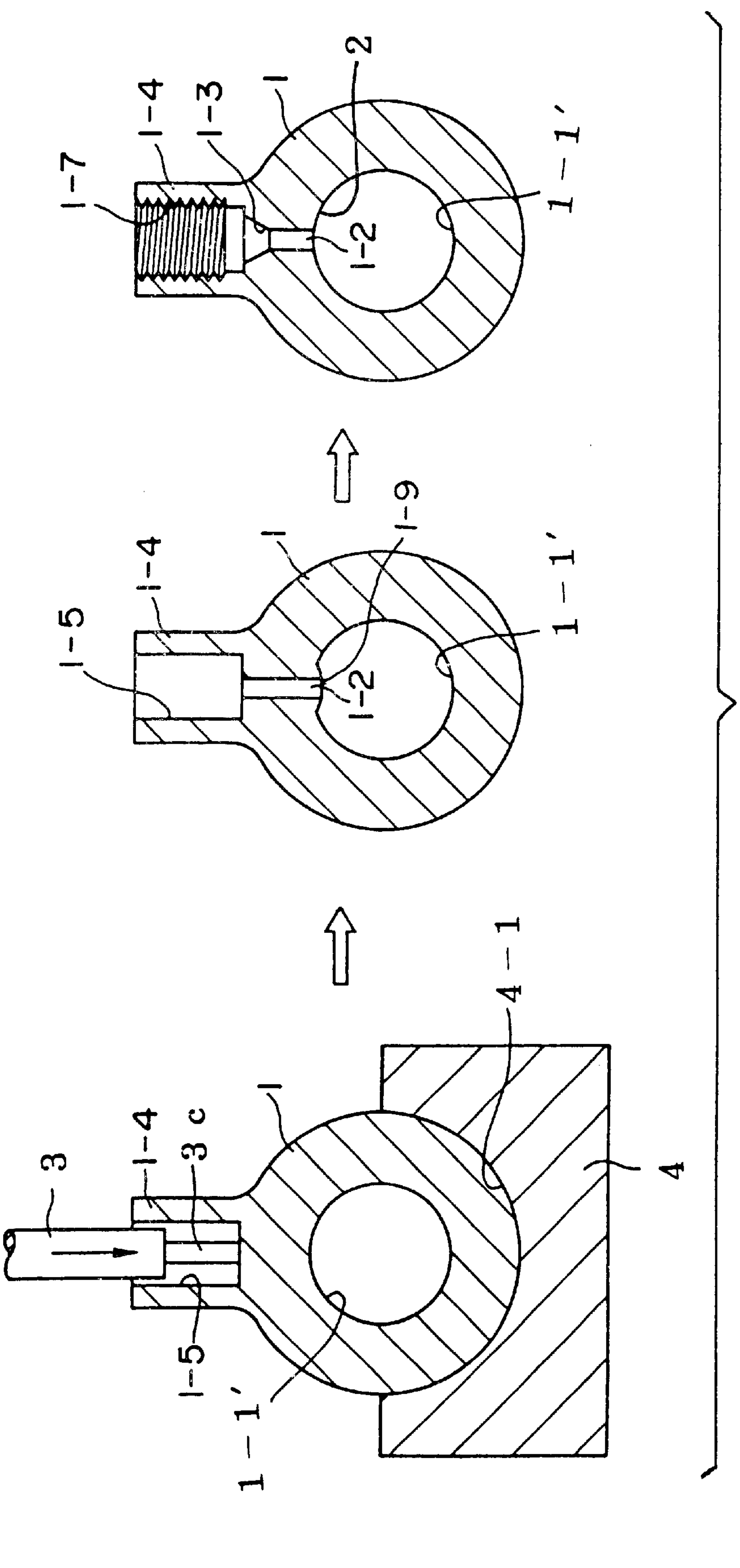
FIG. 12 is a series of cross-sections showing a method for punching a branch hole simultaneously with the application of pressing force in the manufacturing method of the embodiment of FIG. 10.

FIG. 12 shows an example of a method for punching a branch hole simultaneously with the application of pressing force in the manufacturing method of the embodiment shown in FIG. 10, in which a branch hole 1–2 is punched while pressing the bottom part of the bottomed hole 1–5 by use of the punch 3 which has such a diameter as to be fitted in the bottomed hole 1–5 provided in the boss part 1–4 and has a projection 3*c* with the same diameter as that of the branch hole 1–2 at the forward end. In the case of this method, as the bottom part of the bottomed hole 1–5 is pressed by the projection 3*c*, the pressing force is concentratively applied to the part of the simultaneously punched branch hole 1–2 to form a flat part 1–9, and inevitably compressive residual stress remains also in the periphery of the branch hole 1–2.

Subsequently, in a finishing process, after the flat part 1–9 projected inward by the application of pressing force by the punch 3 is removed by machining to form a complete round inner peripheral surface, a branch hole 1–2 which is communicated with the flow passage 1–1' of the member 1 for a high pressure fluid and uses its peripheral surface which is communicated with the flow passage, circular and opened to the outside as a received pressure bearing surface 1–3 is formed on the boss part 1–4, and a female screw 1–7 is machined on the inner peripheral surface of the bottomed hole 1–5 of the boss part.

Figure 13:
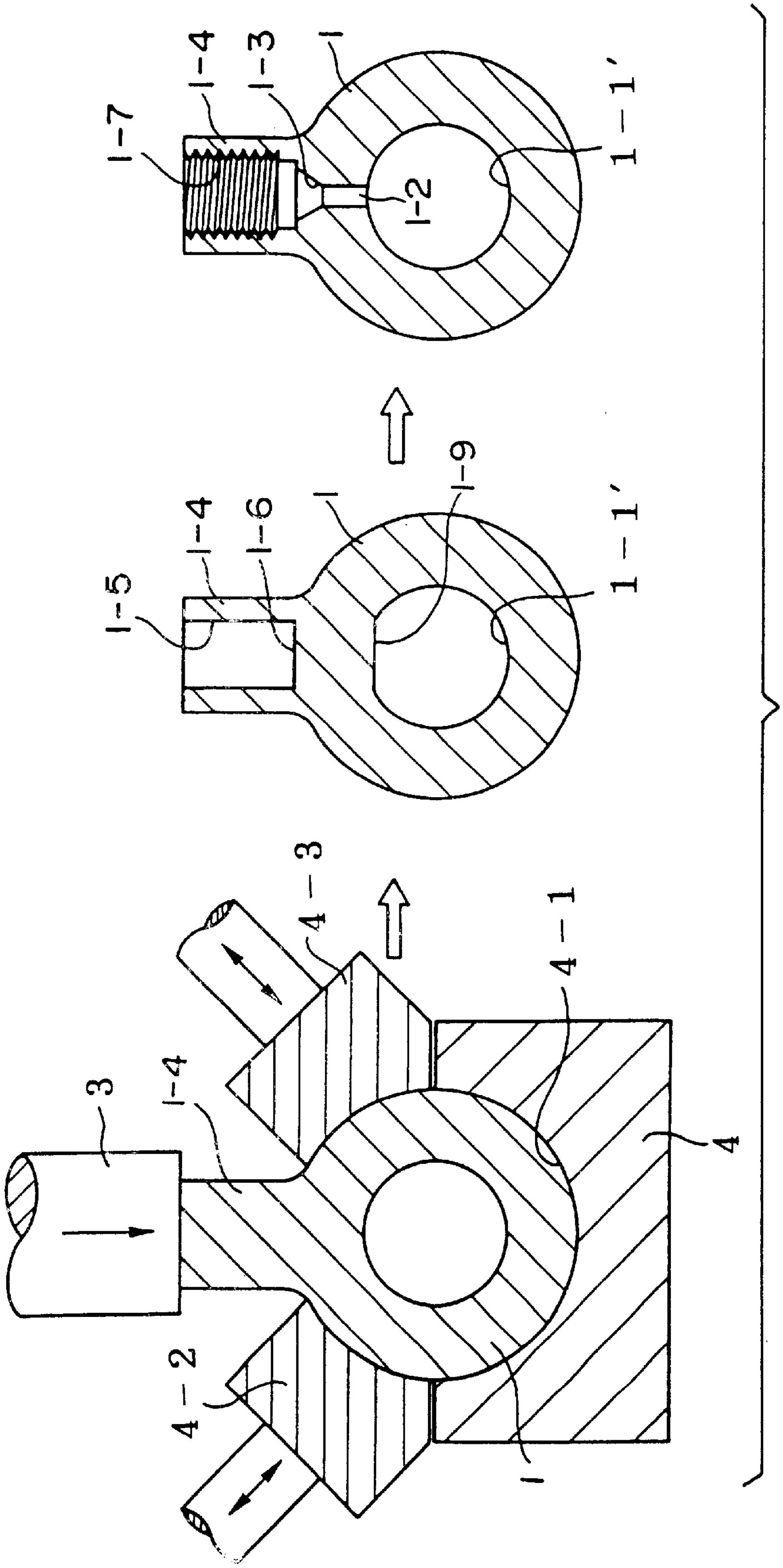
FIG. 13 shows a method for applying pressing force to generate residual compressive force in a common rail of an inside screw type according to the present invention.
Figure 14:
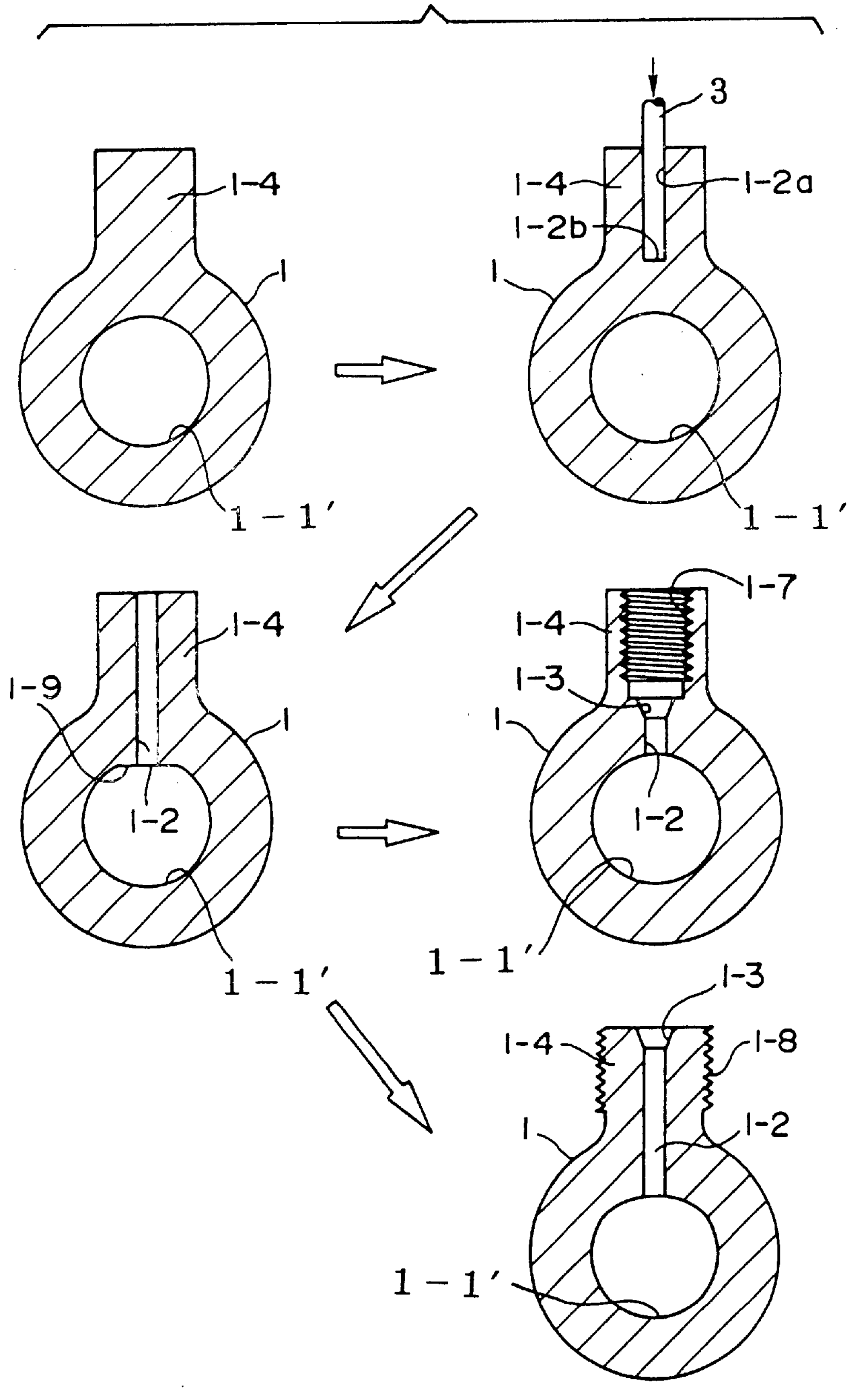
FIG. 14 includes a series of cross-sectional views showing a method capable of fabricating a common rail of an outside screw type or a common rail of an inside screw type according to the present invention.

As a method for applying pressing force by a press method to generate residual compressive force according to the present invention, it is possible to adopt the methods shown in FIGS. 13 and 14 in addition to the above methods.

First in FIG. 13, the member 1 for a high pressure fluid having the boss part 1 is fixed to the lower die 4 by movable dies, and pressing force is applied to the free end part of the boss part by the punch 3 fitted to the press device. The inner peripheral surface of the flow passage 1–1' of the member 1 for a high pressure fluid is a little projected by the pressing force of the punch 3 to form a flat part 1–9 and generate compressive residual stress. Subsequently, the flat part 1–9 of the member 1 for a high pressure fluid projected inward by the application of pressing force by the punch 3 is removed by machining to form a complete round inner peripheral surface, and after a bottomed hole 1–5 with a designated diameter and a designated depth is formed in the boss part 1–4 by cutting, a branch hole 1–2, which is communicated with the flow passage 1–1' of the member 1 for a high pressure fluid and uses its peripheral surface which is communicated with the flow passage, circular and opened to the outside as a received pressure bearing surface 1–3, is formed on the boss part 1–4, and a female screw 1–7 is machined on the inner peripheral surface of the bottomed part 1–5 of the boss part to manufacture the member 1 for a high pressure fluid.

In FIG. 14, a bottomed hole **1–2*a* with the substantially same diameter as that of the later provided branch hole 1–2 and a suitable depth is provided extending from the free end part of the boss part 1–4 in the axial direction, and the inner bottom part 1–2*b* of the bottomed hole 1–2*a* is pressed by the punch 3 which has such a diameter as to be fitted in the bottomed hole 1–2*a* and a length larger than the depth of the bottomed hole, whereby as the inner bottom part 1–2*b* is pressed by the punch 3, the pressing force is concentratively applied to the flat part 1–9 of the later provided branch hole 1–2, so that inevitably compressive residual stress remains also in the periphery of the branch hole 1–2. In the embodiment of FIG. 14, subsequently, the bottomed hole 1–2*a* is extended to the flow passage 1–1' by cutting of a drill or the like to form the branch hole 1–2. Subsequently, the flat part 1–9 of the member 1 for a high pressure fluid projected inward by the application of pressing force by the punch 3 is removed by machining to form a complete round inner peripheral surface. After a bottomed hole 1–5 (See FIG. 3) with a designated diameter and a designated depth is formed in the boss part 1–4 by cutting, a received pressure bearing surface 1–3 is formed in the bottomed hole 1–5, and a female screw 1–7 is machined on the inner peripheral surface of the boss part, or a received pressure bearing surface 1–3 is formed on the outer end surface of the boss part 1–4 to be connected to the branch hole 1–2, and a male screw 1–8** is machined on the outer peripheral surface.

The embodiments of FIGS. 10–14 deal with the case of a member for a high pressure fluid having an integrated boss part, and on the other hand, a method of manufacturing a member for a high pressure fluid having a separate type boss part will now be described with reference to FIGS. 15 and 16.

Figure 15:
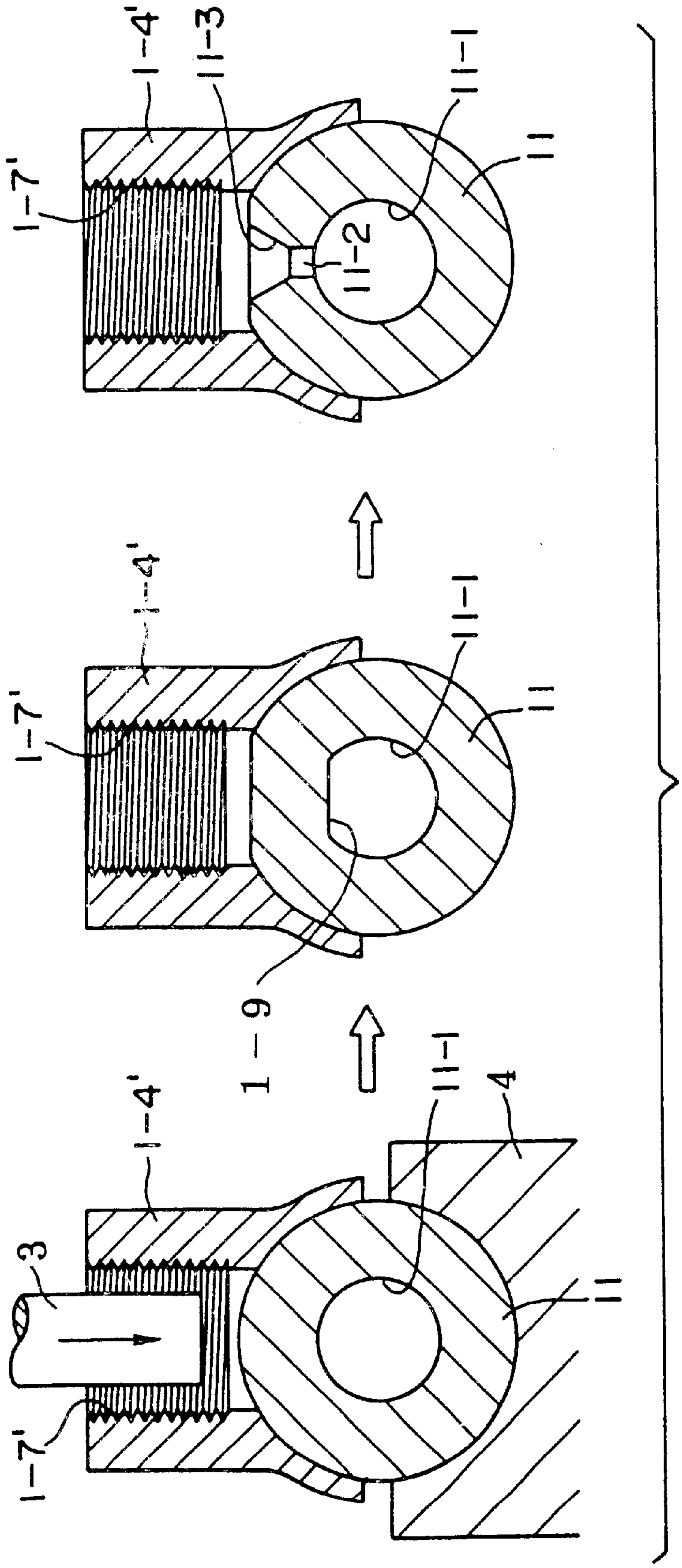
FIG. 15 is a cross-section showing a method of manufacturing a member for a high pressure fluid having a separate type boss part.

According to a method shown in FIG. 15, first in a pre-finishing process, previously one or plural separate type boss parts 1–4' are welded or brazed at spaces to the member 11 for a high pressure fluid. In the separate type boss part 1–4', a female screw 1–7' is machined on the inner peripheral surface thereof. Subsequently, in a press process, the member 1 for a high pressure fluid in the vicinity of the separate type boss part 1–4' is fixed by a lower die 4. The member 1 for a high pressure fluid is fixed to the lower die 4, and pressing force is applied to the outer peripheral surface of the member for a high pressure fluid by the punch 3 which has a diameter smaller than the inside diameter of the boss part 1–4' and is fitted to the press device. The pressing force at this time may be similarly to the above the degree to which the inner peripheral surface of the position where to provide a branch hole 11–2 is a little projected to form a flat plate 1–9. By the pressing force of the punch 3, the inner peripheral surface of the flow passage 11–1 of a member for a high pressure fluid is a little projected to form a flat surface 1–9, and compressive residual stress is generated in the periphery of the opening end part of the branch hole 11–2. Subsequently, in a finishing process, the flat part 1–9 is projected inward by the application of pressing force by the punch 3 is removed by machining to form a complete round inner peripheral surface, and a branch hole 11–2 which is communicated with the flow passage 11–1 of the member 11 for a high pressure fluid and uses its peripheral surface which is communicated with the flow passage, circular and opened to the outside as a received pressure bearing surface 11–3 is formed.

Figure 16:
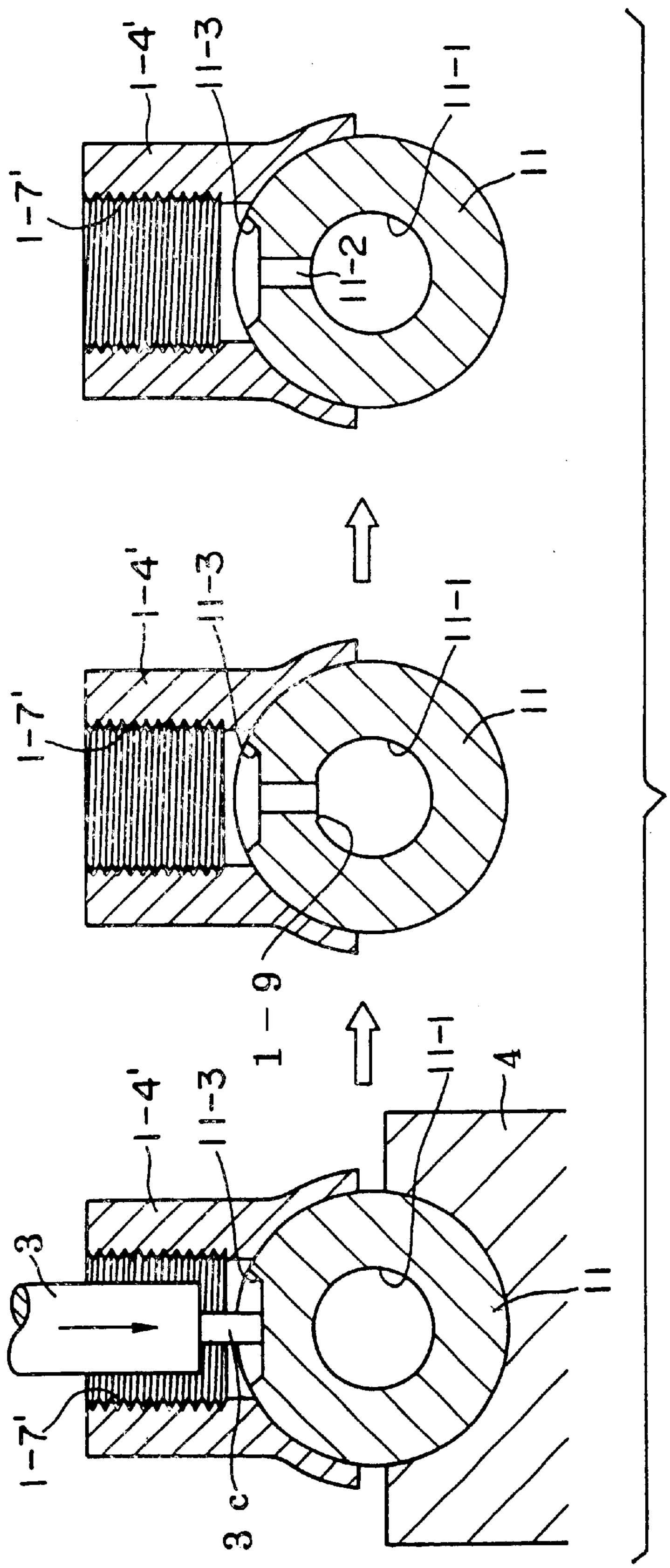
FIG. 16 is a cross-section showing an alternate of the method illustrated in FIG. 15.

According to a method shown in FIG. 16, in a pre-finishing process, previously a received pressure bearing surface is formed on a member 11 for a high pressure fluid, and after a separate type boss part 1–4' is welded or brazed in such a manner as to surround the received pressure bearing surface 11–3, a branch hole 11–2 is punched while the bottom part of the received pressure bearing surface 11–3 is pressed by the use of the punch 3 which has such a diameter as to be fitted in the boss part 1–4' and has a projection **3*c* with the same diameter as that of the branch hole 11–2 at the forward end thereof. In this case, similarly to the above, the bottom part of the received pressure bearing surface 11–3 is pressed by the projection 3*c*, so that pressing force is concentratively applied to the part of the simultaneously punched branch hole 11–2, and inevitably compressive residual stress remains also in the periphery of the branch hole 11–2. Then a flat part 1–9 is a little projected inward by the application of pressing force by the punch 3** is removed by machining to form a complete round inner peripheral surface.

Figure 17:
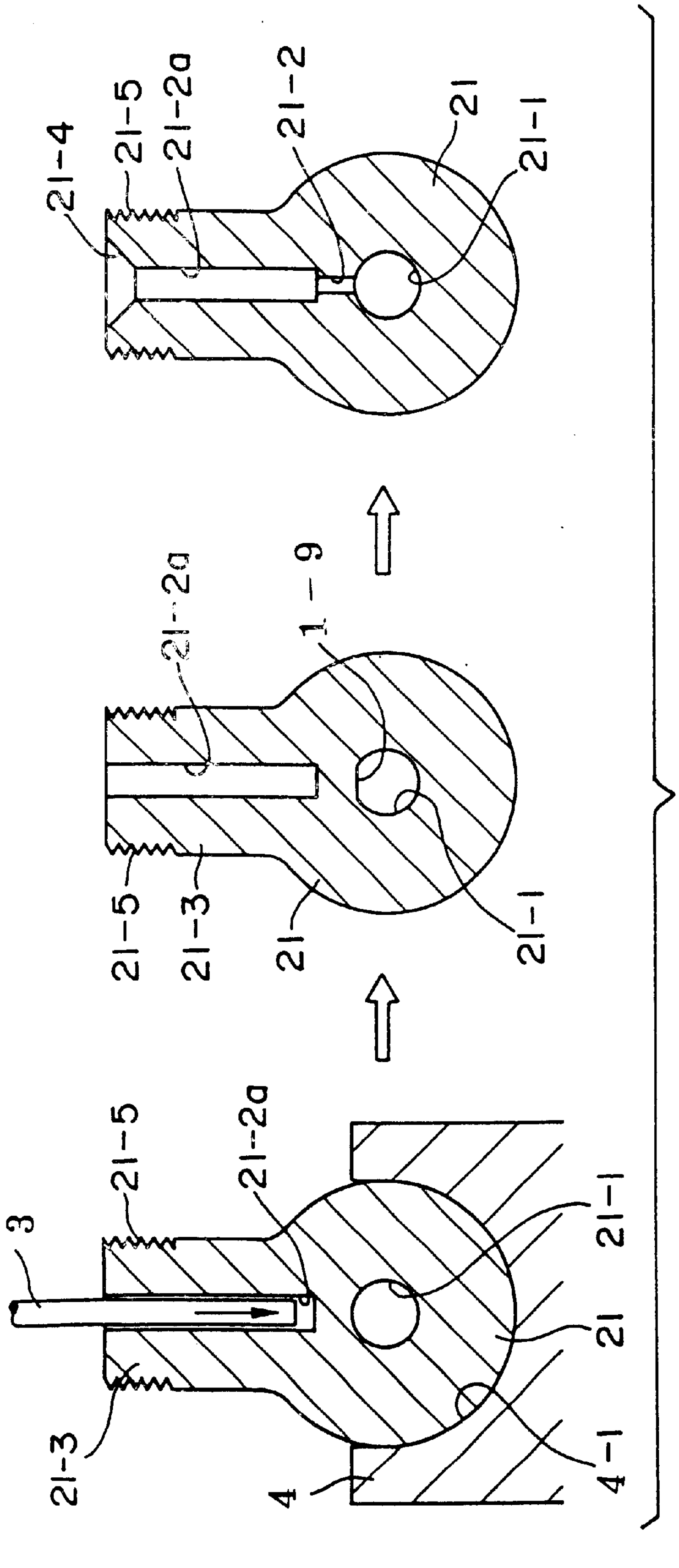
FIG. 17 is a cross-section showing the method for manufacturing a member for a high pressure fluid having an outside screw cut on the boss part.
Figure 18:
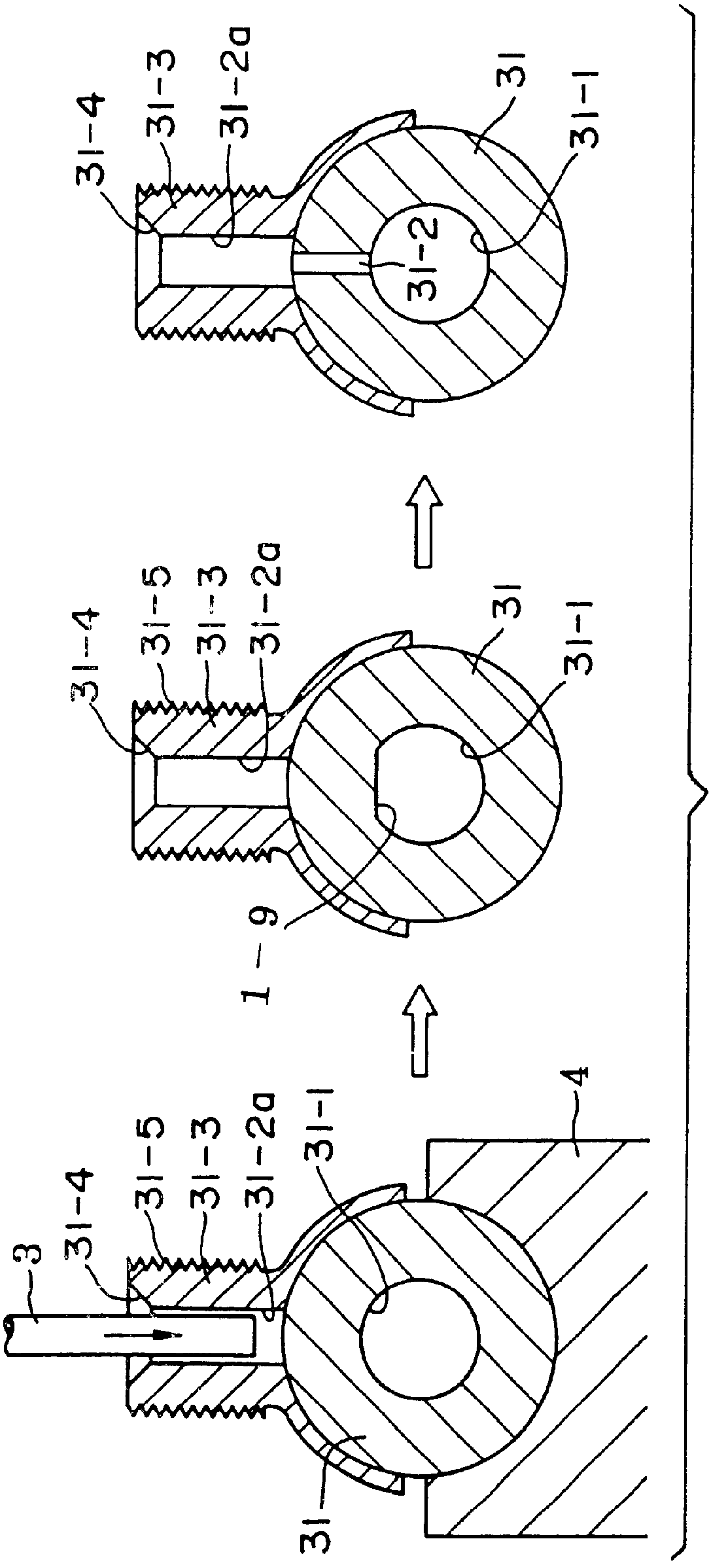
FIG. 18 illustrates a method similar to the method illustrated in FIG. 17, but showing a separate type boss part.

The described embodiments show the embodiment of a member for a high pressure fluid in which an inside screw (female screw) is cut in the boss part, and on the other hand, the embodiments shown in FIGS. 17 and 18 deal with the case of application to a member for a high pressure fluid having an outside screw (male screw) cut on the boss part.

That is, according to the embodiment shown in FIG. 17, which is the case of a member for a high pressure fluid having an integrated boss part, first in a pre-finishing process (cutting process), a branch hole **21–2*a* is formed on an integrated boss part 21–3 by cutting, for example, with an end mill, then in press process, the vicinity of the integrated boss part 21–3 is fixed by a lower die, and pressing force is applied to the bottom part of the branch hole 21–2*a* by the punch 3. The pressing force at this time may be also similarly to the above the degree to which the inner peripheral surface of a flow passage 21–1 of a member 21 for a high pressure fluid positioned right under the bottom part of a branch hole 21–2***a* is a little projected to form a flat part 1–9. By the pressing force of the punch 3, the inner peripheral surface of the flow passage 21–1 of the member 21 for a high pressure fluid is a little projected to form a flat part 1–9, and when the pressing force is applied, a plastic deformed part and an elastic deformed part are produced, and compressive residual stress is generated by deformation caused by a difference in return amount when the pressing force is removed. After that, the flat part 1–9 is removed by machining to form a complete round inner peripheral surface, a received pressure bearing surface 21–4 opened to the outside is formed on the apex of the branch hole 21–2*a,* and a branch hole 21–2 which is communicated with the branch hole 21–2*a* and a designated hole diameter is bored in the bottom part.

All of the members for a high pressure fluid having an integrated boss part where an outside screw (male screw) or an inside screw (female screw) is cut in the described embodiments shown in FIGS. 10 to 17 are so constructed that the center of the flow passage of the member for a high pressure fluid is aligned with the center of the branch hole of the integrated boss part, but it is needless to say that this invention can be, as shown in Japanese Patent Application No. 9-13141, applied to a member for a high pressure fluid in which the center of the branch hole of the integrated boss part is made eccentric in the radial direction of the flow passage of the member for a high pressure fluid.

The embodiment shown in FIG. 18 deals with the case of a member for a high pressure fluid having a separate type boss part, in which first in a pre-finishing process, one or plural separate type boss parts 31–3 are previously welded or brazed at spaces to a member 31 for a high pressure fluid. A branch hole 31–2*a* taking its peripheral surface which is circular and opened to the outside as a received pressure bearing surface 31–4 is formed on the separate type boss part 31–3, and a male screw 31–5 is machine don the outer peripheral surface of the boss part. Subsequently, in a press process, the member 31 for a high pressure fluid in the vicinity of the separate type boss part 31–3 is fixed by a lower die 4.

When the member 31 for a high pressure fluid is fixed to the lower die 4, the pressing force is applied to the outer peripheral surface of the member 31 by the punch 3 which has a diameter smaller than the inside diameter of the separate type boss part 31–3 and is fitted to the press device. The pressing force at this time may be also similarly to the above the degree to which the inner peripheral surface of a position where to provide the branch hole 31–2 is a little projected to form a flat part 1–9. By the pressing force of the punch 3, the inner peripheral surface of the flow passage 31–1 of the member 31 for a high pressure fluid is a little projected to form a flat part 1–9, and compressive residual stress is generated in the periphery of the opening end part of the branch hole 31–2. The flat part 1–9 is similarly to the above removed by machining to form a complete round inner peripheral surface.

The embodiments applied to a member for a high pressure fluid in which the boss part is formed by a sleeve nipple will now be described with reference to FIGS. 19 and 20.

Figure 19:
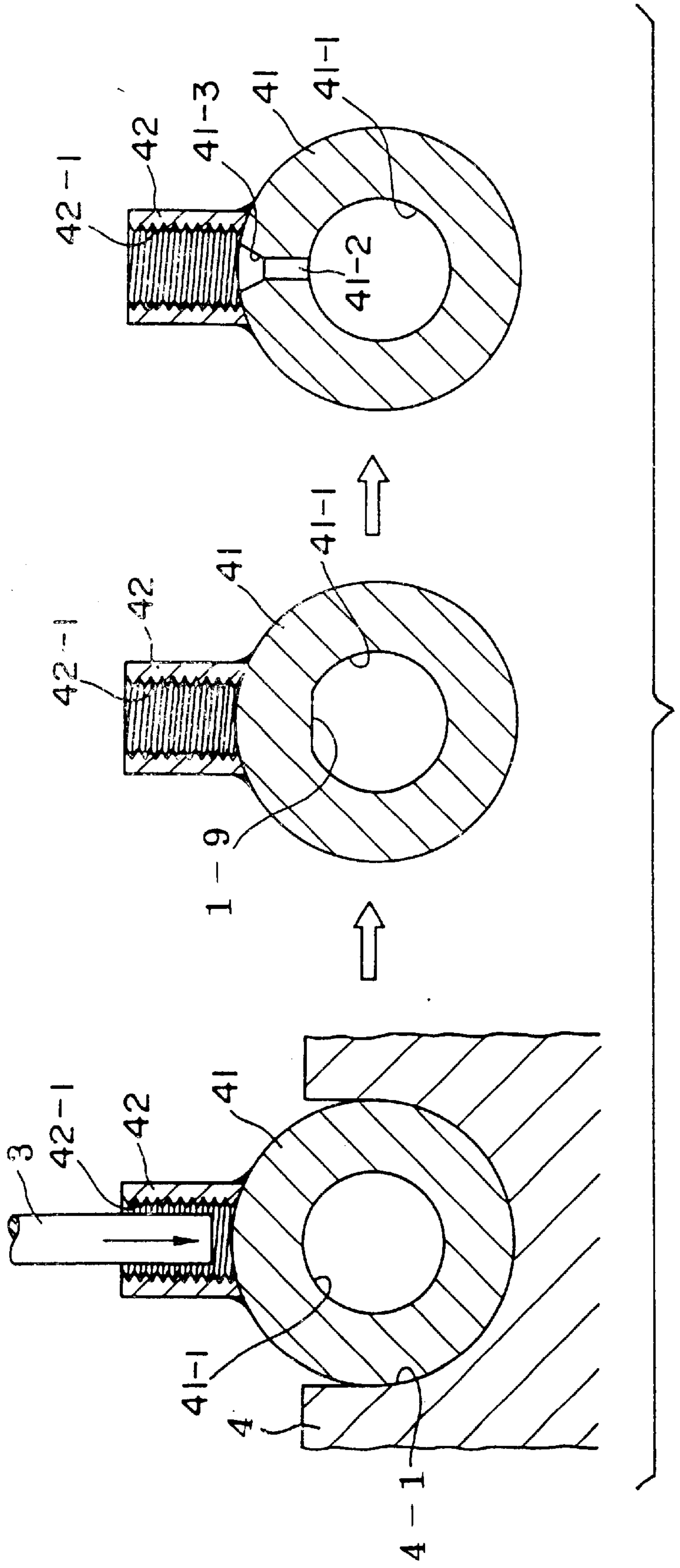
FIG. 19 is a cross section showing still another embodiment of a member for a high pressure fluid with a built-in slider according to the present invention.

In the embodiment shown in FIG. 19, first in a pre-finishing process, a cylindrical sleeve nipple 42 is taken as a coupling fitting and the base end part thereof is directly welded or brazed to the outer peripheral wall of a member 41 for a high pressure fluid. Subsequently, in a press process, the member 41 for a high pressure fluid is fixed in the vicinity of the sleeve nipple 42 fitting part by a lower die 4. The lower die 4 is similarly to the above formed by a metal mold recessed in section having a curved surface 4–1 with the substantially same radius of curvature as that of the outer peripheral surface of the member 41 for a high pressure fluid, and the member 41 for a high pressure fluid is fixed to the lower die 4 in such a manner as to bind the substantially lower half circle. 42–1 is a screw surface.

The member 41 for a high pressure fluid is fixed to the lower die 4, and pressing force is applied inward in the radial direction to the outer peripheral surface of the member 41 for a high pressure fluid on the central axis of the sleeve nipple 42 by the punch 3 fitted to the press device (drawing is omitted). The pressing force at this time may be also as described above the degree to which the inner peripheral surface of the flow passage 41–1 of the member 41 for a high pressure fluid is a little projected to form a flat part 1–9. By the pressing force of the punch 3, the inner peripheral surface of the flow passage 41–1 of the member 41 for a high pressure fluid is a little projected to form a flat part 1–9, and compressive residual stress is generated.

Subsequently, in a finishing process, the flat part 1–9 is removed by machining to form a complete round inner peripheral surface, and a branch hole 41–2 which is communicated with the flow passage 41–1 of the member 41 for a high pressure fluid and uses its peripheral surface which is communicated with the flow passage and circular and opened to the outside as a received pressure bearing surface is formed on a part of the member 41 for a high pressure fluid that is surrounded by the sleeve nipple 42.

Figure 20:
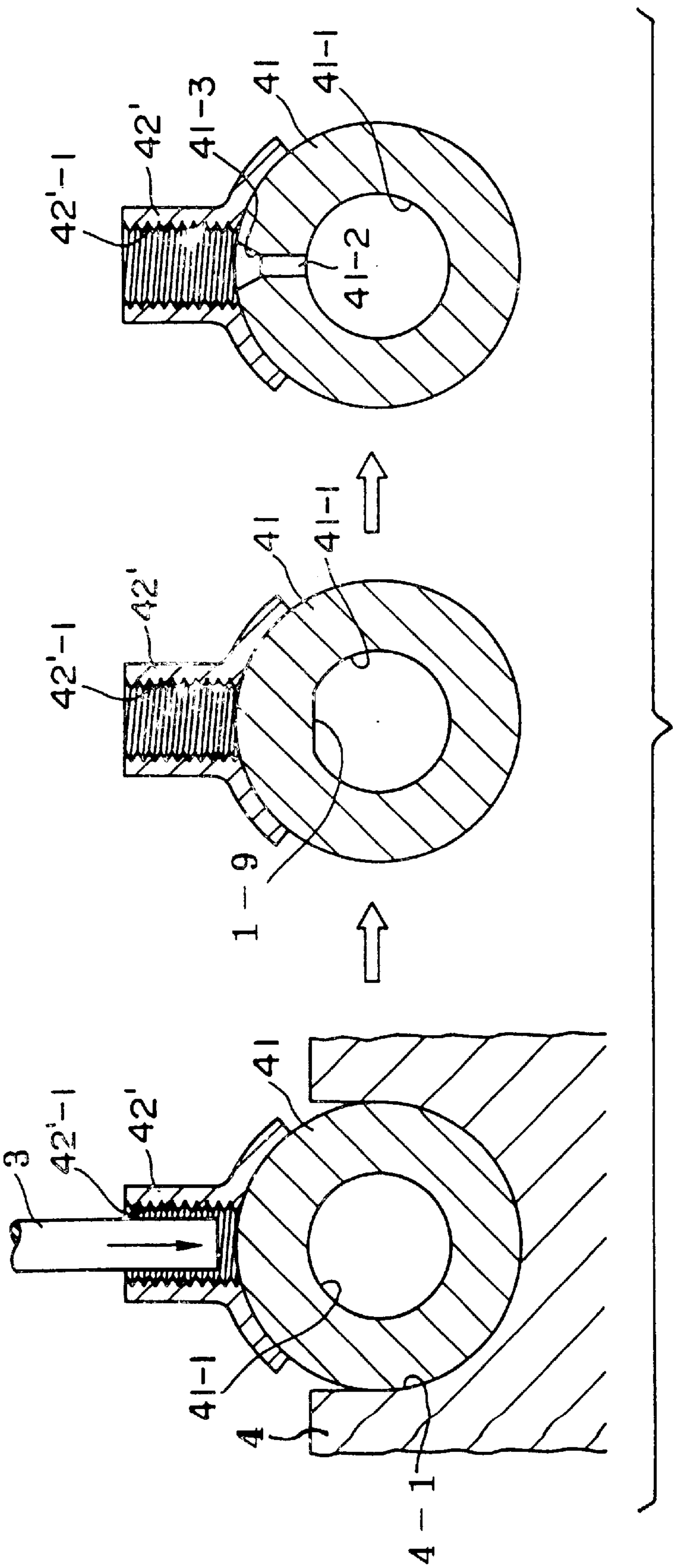
FIG. 20 is a cross section showing a modified form of the embodiment shown in FIG. 19.

Next, the embodiment shown in FIG. 20 deals with the case of using a sleeve nipple 42, the lower end of which is stretched over the member 41 for a high pressure fluid, and the manufacturing method is such that similarly to the embodiment shown in FIG. 19, after a sleeve nipple 42' with a screw surface 42'–1 is welded or brazed to the outer peripheral wall of the member 41 for a high pressure fluid, in a press process, the pressing force is applied inward in the radial direction to the outer peripheral surface of the member 41 for a high pressure fluid on the central axis of the sleeve nipple 42' by the punch 3, so that the inner peripheral surface of the flow passage 41–1 of the member 41 for a high pressure fluid is a little projected to form a flat part 1–9 and compressive residual stress is generated, and after that, the projected flat part 1–9 is removed to make the flow passage 41–1 of the member 41 for a high pressure fluid as a complete round inner peripheral surface, and a branch hole 41–2 which is communicated with the flow passage 41–1 of the member 41 for a high pressure fluid and uses its peripheral surface which is communicated with the flow passage, circuit and opened to the outside as a received pressure bearing surface 41–3 is formed on a part of the member surrounded by the sleeve nipple 42'.

Further, also in the embodiments shown in FIGS. 7–20, it is possible to use pressing force applying means adopting an external pressure system shown in FIGS. 11 (A)–(E), and furthermore, needless to say, it is possible to adopt a method of punching a branch hole simultaneously with the application of pressing force as shown in FIG. 12 and FIG. 16. Further, as a method of applying external pressure by a press method with a punch or the like to generate compressive residual stress, it is possible that pressing is performed a little eccentrically from a portion where to provide a branch hole, thereby generating compressive residual stress at least in a part of the branch hole, that is, in the inner peripheral edge part P of the lower end of the branch hole which becomes a starting point of cracks.

As described above, the present invention has the advantage that the generation of tensile stress in the inner peripheral edge part of the lower end of a branch hole can be canceled by compressive residual stress to be effectively restrained, and the internal pressure fatigue strength can be improved, so that durability is excellent and the fluid leakage due to the occurrence of cracks can be prevented to exhibit a sure and stable function.

Further, the member for a high pressure fluid with a built-in slider of the present invention has the advantage that the generation of tensile stress in the inner peripheral edge part of the lower end of a branch hole can be canceled by the compressive residual stress to be effectively restrained and the internal pressure fatigue strength in the branch hole part can be improved, so that durability is excellent and the fluid leakage due to the occurrence of cracks can be prevented to exhibit a sure and stable function.

Further, according to the present invention, it is very advantageous that only the addition of a pressing force applying process to an ordinary manufacturing process will be sufficient, and complicated equipment is not required to hardly causes the problems of an increase in equipment cost due to an increase in the number of processes and lowering of productivity, and a member for a high pressure fluid of higher quality can be provided at a low cost.

What is claimed is:

1. A member for a high pressure fluid having an axial peripheral wall with a flow passage in an axial interior of the axial peripheral wall, said flow passage having a cylindrical inner surface, at least one boss part provided integrally on the axial peripheral wall and having a branch hole intersecting said flow passage, wherein the branch hole is formed at least partly by a pressing force applied in an axial direction of said boss part by an external pressure with sufficient force such that at least a part of the axial peripheral wall adjacent said branch hole is projected inwardly relative to the cylindrical inner surface, the external pressure creating a compression residual stress in portions of said axial peripheral wall adjacent the branch hole for offsetting tensile stress created by the high pressure fluid in the flow passage and a branch hole, and then said projected part being removed to form a complete round inner peripheral surface while retaining at least a portion of the compression residual stress in the axial peripheral wall adjacent the branch hole for improving fatigue strength.

2. A member for a high pressure fluid having an axial peripheral wall with a flow passage in an axial interior and a branch hole formed through the axial peripheral wall and communicated with said flow passage, at least one sleeve nipple part fitted to the axial peripheral wall by welding or brazing, wherein a pressing force is applied in the axial direction of said sleeve nipple by an external pressure with sufficient force such that at least a part of the axial peripheral wall adjacent said branch hole is projected inwardly relative to the axial interior, the external pressure creating a compression residual stress in portions of said axial peripheral wall adjacent the axial interior and the branch hole for offsetting tensile stress created by the high pressure fluid in the flow passage and the branch hole, and then said projected part is removed to form a complete round inner peripheral surface while retaining at least a portion of the compression residual stress in the axial peripheral wall adjacent the branch hole for improving fatigue strength.

3. A branch hole part of a member for a high pressure fluid, said member having a hollow part formed by a substantially circular peripheral wall, said peripheral wall having an inner peripheral surface and an outer peripheral surface, with a wall thickness extending therebetween, said high pressure fluid in said hollow part and said branch hole part generating tensile stress in portions of said peripheral wall adjacent the inner peripheral surface and the branch hole part, said branch hole part comprising:

a bore formed to penetrate the wall thickness of said member to form an inner peripheral edge within said wall, said branch hole part being in communication with said hollow part of said member; and a compression residual stress produced in portions of the peripheral wall adjacent to the branch hole part by applying a radial inward pressing force to the outer peripheral surface regions of the peripheral wall, said pressing force being sufficient to define a substantially planar surface area on the inner peripheral surface of the peripheral wall surrounding the branch hole, the planar portion of the inner surface of the peripheral wall intersecting the substantially circular peripheral wall of said hollow part, the compressive residual stress offsetting the tensile stress generated by the high pressure fluid and thereby improving fatigue resistance of the branch hole part.

* * * * *